(12) United States Patent
Leach

(10) Patent No.: US 6,592,937 B1
(45) Date of Patent: Jul. 15, 2003

(54) COATING OF SUBSTRATE USING PH MONITORING FOR ADHESION PROMOTION

(75) Inventor: Roger John Leach, Leatherhead (GB)

(73) Assignee: Thornstone Business Machines Limited, Isle of Man (GB)

( * ) Notice: Subject to any disclaimer, the term of this patent is extended or adjusted under 35 U.S.C. 154(b) by 0 days.

(21) Appl. No.: 09/807,053

(22) PCT Filed: Oct. 8, 1999

(86) PCT No.: PCT/GB99/03339

§ 371 (c)(1),
(2), (4) Date: Apr. 6, 2001

(87) PCT Pub. No.: WO00/20349

PCT Pub. Date: Apr. 13, 2000

(30) Foreign Application Priority Data

Oct. 8, 1998 (GB) ............................................... 9821984

(51) Int. Cl.$^7$ ............................... B05D 1/12; B05D 1/38
(52) U.S. Cl. ........................... 427/195; 427/8; 427/201; 427/202; 427/421
(58) Field of Search ........................... 427/8, 470, 475, 427/480, 485, 486, 195, 201, 202, 333, 340, 421; 134/3, 26–29

(56) References Cited

U.S. PATENT DOCUMENTS

| | | | |
|---|---|---|---|
| 3,558,345 A | * | 1/1971 | Baum |
| 5,066,361 A |   | 11/1991 | Scharf |
| 5,306,526 A | * | 4/1994 | Gray et al. |
| 5,326,594 A | * | 7/1994 | Sabata et al. |
| 5,455,080 A |   | 10/1995 | van Ooij |
| 5,532,024 A |   | 7/1996 | Arndt et al. |

FOREIGN PATENT DOCUMENTS

| | | | |
|---|---|---|---|
| EP | 0 098 315 |   | 7/1982 |
| EP | 332 344 | * | 9/1989 |
| EP | 0 332 344 A |   | 9/1989 |
| EP | 0 577 014 |   | 6/1993 |
| EP | 0 585 639 |   | 8/1993 |
| EP | 0 590 594 |   | 9/1993 |
| EP | 0 592 139 A |   | 4/1994 |
| EP | 811 430 | * | 12/1997 |
| EP | 0 811 430 A |   | 12/1997 |
| GB | 2 207 089 | * | 1/1989 |
| GB | 2 207 089 A |   | 1/1989 |
| WO | 97/17144 |   | 5/1997 |

OTHER PUBLICATIONS

Japanese Abstract, XP002130321 dated Mar. 14, 1995 issued to Shinetsu Chem. Ind. Co. Ltd. (To Follow).

* cited by examiner

Primary Examiner—Fred J. Parker
(74) Attorney, Agent, or Firm—Davis & Bujold, P.L.L.C.

(57) ABSTRACT

Adhesion of a thermosetting powder coating to a glass substrate surface using a silane adhesion promoter, is enhanced by modifying the pH of the glass surface to between 3.5 and 5, prior to, or during, the action of the promoter. The pH-modification may be effected during washing of the surface prior to spray-application of the promoter, or by including an acid or alkali modifier in the silane solution. Alternatively, the silane, or the silane and the modifier, may be included in the thermosetting powder to become active during fusing of the powder to the glass surface. An acid or alkali solution dried on the surface prior to application of the promoter for activation with the promoter on heating, may be used instead or in addition.

21 Claims, 1 Drawing Sheet

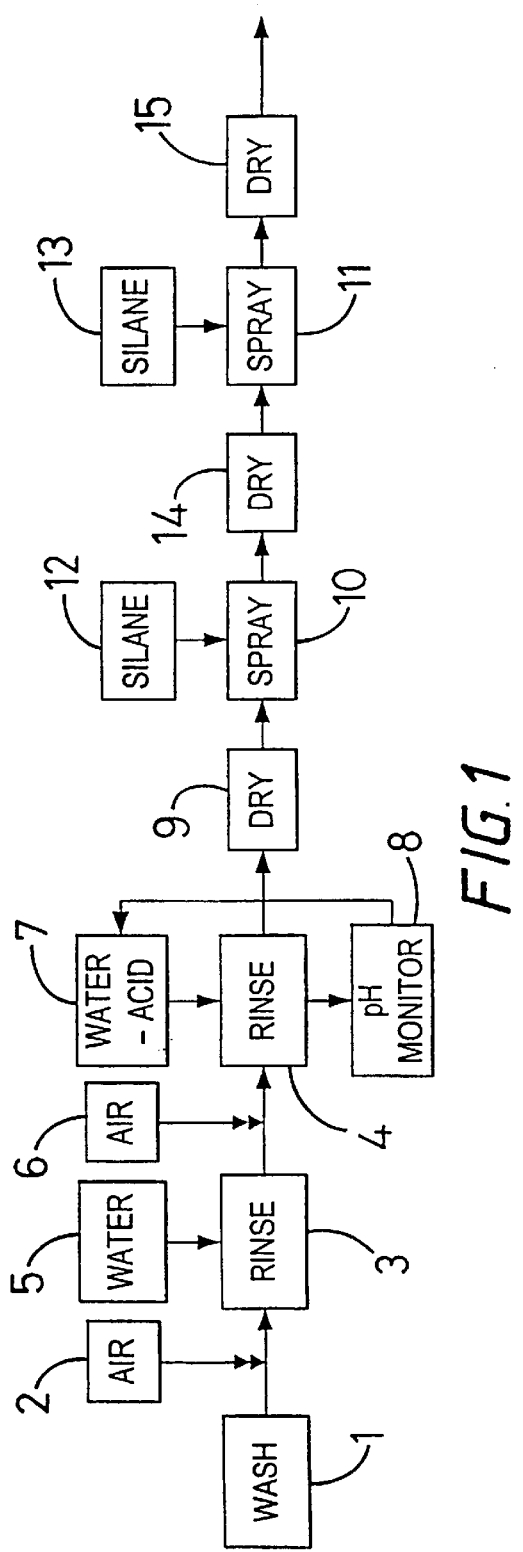
FIG.1
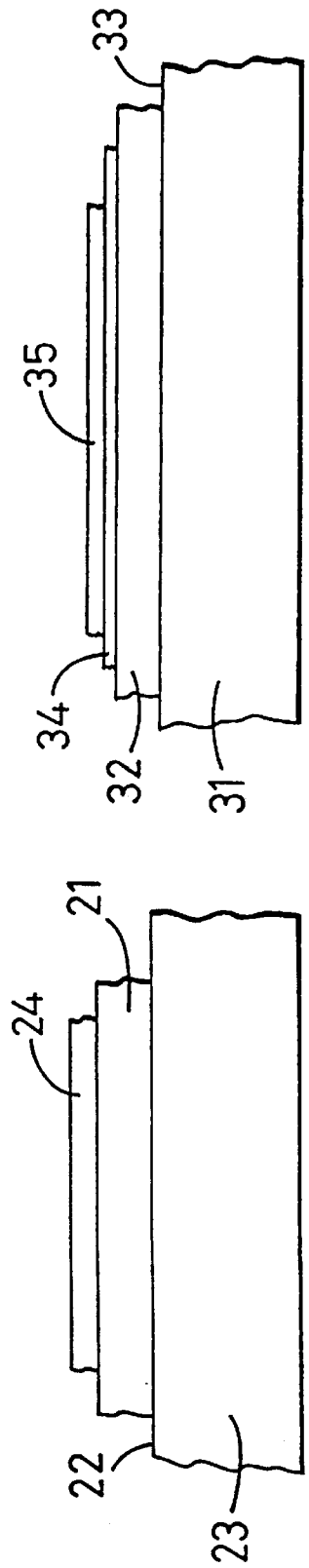
FIG.2
FIG.3

COATING OF SUBSTRATE USING PH MONITORING FOR ADHESION PROMOTION

FIELD OF THE INVENTION

This invention relates to adhesion promotion.

The invention is especially, though not exclusively, concerned with methods involving organosilane adhesion-promoters on glass, metal or other surfaces.

SUMMARY OF THE INVENTION

The use of organosilanes as adhesion promoters has been found to require especial care. In particular, the adhesion achieved is affected by the pH of the organosilane solution and the thickness of the film deposited on the substrate surface. An object of the present invention is to provide methods by which good adhesion can be achieved.

According to the present invention there is provided a method of promoting adhesion with a substrate surface wherein the pH of said surface is modified to initiate the action of an adhesion-promoting agent and thereby enhance adhesion at said surface.

The reaction required on a glass or metal surface to promote optimum adhesion has been found to be critically sensitive to the history of the surface in regard to transport, abrasion and/or cleaning. This history has been found to affect the pH of that surface and the efficacy of adhesion as promoted, for example, by organosilanes.

It is common for the suppliers of organofunctional silanes to specify that the conditions of use of the silanes should be such as to sustain two reactions, these being hydrolysis primarily, and condensation. The recommended pH range for the organosilane when used with glass is from 3.5 to 5, but observations have indicated that even when using solutions within this range, there are common and consistent fluctuations in adhesion within each batch of sample glass.

These observations led to a detailed analysis, and from this it was found that the variation in adhesion within the batch paralleled the variation in pH of pure water into which the sample glass was immersed prior to application of the organosilane. From this it was determined that the presence of detritus of glass from abrasion (during transport or otherwise) or machining, develops an alkali solution when the surface is wetted. Accordingly, it was concluded that the machining of glass or the abrasion of two sheets upon one another during shipping or otherwise, leaves a residue of detritus on the glass that affects the pH-value of the silane solution, and therefore the performance, of the adhesion promoter. It was observed, moreover, that even if the washing water used for the glass is copiously changed and the product flushed with pure water, an alkaline residue is generally left on the glass after drying. This residue, when wetted by the organosilane solution, reduces the pH value of the solution and renders the hydrolysis reaction, partially or fully, ineffective.

The residue in the case of glass is alkaline but for other surfaces it may be acidic, and in accordance with a feature of the present invention the pH of the residue may be monitored and a compensatory adjustment of the pH of the adhesion-promoter solution made to effect optimum adhesion. To this end, the pH of the washing water at the final rinse station may be monitored and acid or alkali added to the promoter solution to give the optimum performance. For example, where glass is involved, acetic or some other acid may be added to ensure that the active organosilane solution wetting the glass surface has a pH within the optimum range of 3.5 to 5 for the hydrolysis reaction to take place.

The matter of the pH value of the surface-residue as referred to above, is important for the effectiveness of powder coating of substrates. In the case of glass substrates, the alkalinity of the surface to which the coating powder is applied affects the hydrolysis reaction required for the silane to give good adhesion. But by first spraying the glass surface with an acid solution (for example, a 10% solution of acetic acid in pure water) and allowing it to dry, the alkalinity can be effectively counteracted. The dried acid is reactivated during the initial heating of the powder for the curing process, so as to balance out the alkalinity shown by the glass and thereby ensure that the powder-borne organosilane is fully active in providing good adhesion between the substrate surface and its resultant powder coating.

Clearly, where the substrate surface to be coated with the powder exhibits acidity, that surface can be sprayed with an alkaline solution for counteracting the acidity and ensuring good adhesion promotion.

Furthermore, in accordance with the invention the adhesion-promoting agent may be included with the coating powder so as to become active when the powder is heated for fusing. The powder may also include an acid or alkali to initiate the action of the adhesion-promoting agent at the substrate surface during the heating.

BRIEF DESCRIPTION OF THE DRAWINGS

Methods in accordance with the present invention will now be described, by way of example, with reference to the accompanying drawings, in which:

FIG. 1 is illustrative of part of a production line for coating glass sheeting with powder coatings using a silane adhesion promoter, in accordance with the present invention; and FIGS. 2 and 3 are illustrative of powder-coated panels manufactured according to the present invention.

DESCRIPTION OF THE INVENTION

Referring to FIG. 1, the surface of the glass sheeting to be powder coated is first cleaned in a washing station 1, and following washing any liquid retained on the glass is blown from the surface using a curtain of air or 'air knife' from a blower 2. The surface is now subjected to two rinsing operations in successive rinsing stations 3 and 4. The surface is rinsed with water from a source 5 in the station 3, and an 'air knife' from a blower 6 frees it of water, as the glass passes to the second rinsing station 4.

The rinsing of the surface in station 4 is with water containing acetic or other acid supplied from a source 7. The acid content of the rinsing water is determined according to the pH value at the glass surface, to compensate for any difference of that value from an optimum, or optimum range, for initiating the adhesion-promoting action of the silane to be used. More especially, and as represented in the drawing, the acid content of the rinsing water is regulated in dependence upon a reading provided by a monitor 8 of its pH value when in contact with the glass surface, to bring the glass surface to a pH value of 3.5 or at least within the range 3.5 to 5.

Although regulation of the acid content of the rinsing water in the second rinse is represented in FIG. 1 as being automatic, this is not necessarily the case, and manual regulation may be used instead. It has been found that throughout any one batch of glass, the pH value at the surface is likely to be reasonably consistent to the extent that frequent adjustment of the acid content is not required.

The glass as washed in the second rinsing station passes through a drying station 9 to receive application of a film of the silane promoter prior to deposition of the powder coating material. A minimal film of silane is required to give the best adhesion, and the application of the film can be improved in this respect by the addition of alcohol when mixing the solution. The alcohol acts as a wetting agent and a continuous film is therefore more simply applied. Silane is supplied as a concentrate and may also be reduced with alcohol or water to enable an economic application of a fine film. Typical silane solutions containing alcohol and the methods of their application for adhesion promotion on glass are described in GB-A-2207089 and GB-A-2252079, but use of these requires imposition of flash-proof conditions as protection against the alcohol vapour given off during curing of the powder coating. The flash-proof equipment and the necessary extraction of vapours is both costly and environmentally unacceptable in many potential factory locations and is avoided in the present case. More particularly, a water-based solution of the promoter is used, without the involvement of alcohol, and is sprayed onto the dried, pH-modified, glass surface, within successive spray stations 10 and 11.

The silane solution, which has 3% silane to 97% pure water, is supplied to the stations 10 and 11 from reservoirs 12 and 13 respectively. The solution is well mixed using an oscillating motor; a proper mix is essential and it has been found that this can be best achieved by placing the solution, within a glass receptacle, upon a vibrating bed driven by the motor. It has also been found that it is not desirable to make use of a plastics receptacle for the solution in that an early reaction is promoted with the surface of the receptacle. Furthermore, plasticisers are released polluting the solution and discolouring it, and the adhesion-promoting properties are reduced.

In the absence of an alcohol wetting agent, a water-based solution of the promoter has a high surface tension and globulates upon the clean glass. Wiping the solution onto the glass using French polishing techniques (first spray and then wipe down with a cloth wetted with solution) does give a good cover, but the process is prone to leaving fibres from the wetting cloth upon the surface. Furthermore, spray application tends to build spherical, globular drops of solution, which do not promote a continuous adhesion coating.

However, it has been found that the globulating nature of the silane can be exploited by spraying a minimal coat of the well mixed water-silane solution onto the glass surface in station 10, and then applying a second coat in station 11 after the first coat has been dried in an intermediate drying station 14.

The silane solution is sprayed onto the glass surface within the station 10 with the intention that the coating should be globular and have a coverage of about 60% with globule depth of about 10 microns. The globules are reduced by water-evaporation within the drying station 14 to spots of silane on the glass surface that are only about 5% of the 10-micron wet-globule size (not unlike a print half tone of 120 screen). The second coat sprayed onto the spotted surface, in the second spray station 11, is applied with a flow rate, for example 5 ml per minute, that is only half that used in the first spray station 10. The silane has an affinity for the uncoated glass and as a consequence flows into the spaces between the silane spots. By adopting a reduced flow rate for the second coat the uncoated spaces are filled without over-coating the first coat. The reduced-flow rate also enables the finished coat to have a consistent depth with a continuous coating.

The temperature of application of the silane solution is controlled to give quick dry between coats but without drying out the first-coat globules until they are naturally formed. The formed spots are dry ready for application of the second coat within, for example, the time taken for the glass moving at, say 2 m per minute, to pass from station 10 to station 11. The optimum temperature at stations 100 and 11 has been found to be about 35 to 40 degrees Celsius.

The silane-coated glass sheeting leaving the second spray station 11 passes through a drying station 15 before application of the thermosetting coating powder in a subsequent stage (not shown) of the production line of FIG. 1.

As an alternative to use of the two spray stations 10 and 11 to form the thin, silane film coating, it is possible to use a rotating-bell spray gun to distribute the solution as a very fine mist on the pH-modified surface.

Rather than depositing a silane film on the substrate as described above, it is possible to mix an organosilane into the powder used for coating. This may be by reduction of the solution into the powder, coating the powder-particles with the silane so that it is brought into contact with the pH-modified glass surface and activated during the initial phase of curing the powder. Such a technique has been shown to be effective with epoxy-resin powders.

Instead of reducing the silane solution into the coating powder, however, the silane can be involved in the initial mix used for manufacture of the powder. More especially, the silane and an acid may be included in the initial mix. In the latter respect, the acid is included with the object of providing appropriate pH-modification of the glass surface on which the powder is deposited, for optimum action of the silane.

Two powder-coated panels formed using coating powders that include a silane and an acid as referred to above from manufacture, will now be described with reference to FIGS. 2 and 3.

Referring to FIG. 2, a thermosetting epoxy-based powder is in this case deposited electrostatically as a layer 21 on a surface 22 of a substrate 23 of toughened glass. The powder includes, from manufacture, silane and acid components as referred to above, as well as pigmentation. Heat to melt and cure the powder of layer 21 is applied only after a layer 24 of polyethylene powder has been deposited electrostatically on the layer 21.

The applied heat causes both powder layers 21 and 24 to melt. The acid in the melted layer 21 is activated to modify the pH at the surface 22 and initiate the action of the silane to provide the conditions for good adhesion with the surface 22. The melting of the polyethylene layer 24 on the other hand cause a degree of intermixing with the melted epoxy layer 21 at their interface, so that on hardening of the layer 24 and curing of the layer 21 there is cohesion between them in a good physical bond.

Referring to FIG. 3, the panel in this case involves a substrate 31 of annealed glass and a transparent polyester-based powder deposited electrostatically as a layer 32 on a surface 33 of the substrate 31. The powder of layer 32 includes, from manufacture, silane and acid components as referred to above, and a layer 34 of another polyester powder not including such components, is deposited electrostatically on the layer 32. The powder of layer 34 includes pigmentation.

Heat is applied to melt and cure the powders of both layers 32 and 34. During the melt phase of the powder of layer 32, its acid component is activated to modify the pH at the surface 33 and initiate the action of the silane to provide the conditions for good adhesion with that surface. Furthermore, there is cross-linking at the interface between the two layers 32 and 34 so that when the powders cure there is a strong chemical bond between the resultant coatings and between them and the substrate 31.

It is desirable that the layer 32 cures faster than the layer 34 so that while it is gelling a nip roller can be used to press down and smooth out the layer 34 for even cover of the coating of layer 32. Furthermore, a water-protective foil 35 is laid down in contact with the layer 34 while still in the melt phase so as to be bonded firmly to it on cure of this layer.

What is claimed is:

1. A method of applying a coating to a substrate surface in which an adhesion-promoting agent for promoting adhesion between the coating and the substrate surface is applied to the substrate surface before application of the coating thereto, the method comprising the steps of:

washing the substrate surface prior to application of the adhesion-promoting agent to the substrate with a washing liquid;

monitoring the pH of the washing liquid at the substrate surface to determine the pH value at the substrate surface; and modifying the pH of the substrate surface to enhance the adhesion-promoting agent facilitating adhesion of the coating with the substrate surface based upon the pH value determined during the monitoring step.

2. The method according to clam 1, further comprising the step of providing an organosilane as the adhesion-promoting agent.

3. The method according to claim 1, further comprising the step of providing glass as the substrate.

4. The method according to claim 1, further comprising the step of using the adhesion-promoting agent to promote adhesion of a powder coating with the substrate surface.

5. The method according to claim 4, further comprising the steps of applying adhesion-promoting agent as a film-coating to said surface, depositing thermosetting powder-coating material on the film-coated surface, and melting and curing the powder by application of heat to form the cured-powder coating adhering to said surface.

6. The method according to claim 1, further comprising the step of applying the adhesion-promoting agent to the substrate surface in solution for promoting adhesion of the coating with the substrate surface when the solution has a pH within a range of pH values, and adjusting the pH of the solution to compensate for any deviation from said range of the pH value determined during the monitoring step.

7. The method according to claim 6, further comprising the step of providing glass as the substrate surface and said range of pH values is substantially 3.5 to 5.

8. The method according to claim 1, further comprising the step of applying the adhesion-promoting agent to the substrate surface in a water-based solution and spraying the solution onto the substrate surface as a first coat to dry in the form of spaced spots on the substrate surface, and then spraying a second coat onto the dried first coat.

9. The method according to claim 8, further comprising the step of spraying the second coat at a reduced flow-rate as compared with the first coat.

10. The method according to claim 1, further comprising the step of depositing an acid or alkaline solution on the substrate surface preliminarily to application of the adhesion-promoting agent.

11. A method of applying a coating to a substrate surface, the method comprising the steps of:

washing the substrate surface with a washing liquid;

monitoring the pH of the washing liquid at the substrate surface to determine the pH value at the substrate surface;

applying an adhesion-promoting agent to the substrate surface; and applying the coating to the substrate surface after the application of the adhesion-promoting agent thereto, the adhesion-promoting agent being effective to promote adhesion between the coating and the substrate surface when the pH of the substrate surface is within a range of pH values, and the step of washing the substrate surface includes adjusting the pH of the washing liquid to bring the monitored pH value of the washing liquid to within the range of pH values.

12. The method according to claim 11, further comprising the step of drying the washing liquid on the substrate surface and depositing the adhesion-promoting agent on the substrate surface after the washing liquid is dried thereon.

13. The method according to claim 12, further comprising the step of spraying the adhesion-promoting agent onto the substrate surface after the washing liquid is dried thereon.

14. The method according to claim 11, further comprising the step of providing glass as said substrate and said range of values is substantially 3.5 to 5.

15. A method of forming a coating on a substrate surface comprising the steps of:

washing the substrate surface with a liquid;

monitoring the pH of the washing liquid at the substrate surface to determine the pH value at the substrate surface;

adjusting the pH of the washing liquid to a desired pH value depending upon the monitored pH value;

depositing a thermosetting powder on the substrate surface, said powder comprising powdered thermosetting material and an adhesion-promoting agent in powder form for promoting adhesion between the coating and the substrate surface; and applying heat to the deposited powder to fuse it into the coating adhering to the substrate surface.

16. The method according to claim 15, further comprising the step of providing the thermosetting material as a polyester or epoxy resin.

17. The method according to claim 15, further comprising the step of drying the washing liquid on the substrate surface and depositing the powder on the substrate surface after the washing liquid is dried thereon.

18. The method according to claim 15, further comprising the step of providing glass as the substrate surface and adjusting the pH of the washing liquid to bring the monitored pH value to lie within the range of 3.5 to 5.

19. The method according to claim 15, further comprising the step of providing an acid or alkali with the thermosetting material to initiate the action of the adhesion-promoting agent at the substrate surface during the application of the heat.

20. The method according to claim 15, further comprising the step of providing glass as the substrate and the thermosetting material includes silane as the adhesion-promoting agent and an acid to initiate the action of the silane at the substrate surface during application of the heat.

21. A method of applying a coating to a glass-substrate surface the method comprising the steps of;

washing the substrate surface with a washing liquid;

monitoring the pH of the washing liquid at the substrate surface to determine the pH value at the substrate surface;

adjusting the pH of the washing liquid to bring the monitored pH value within a range of about 3.5 to 5;

drying the substrate surface;

applying an adhesion-promoting agent to the dried substrate surface for promoting adhesion between the coating and the substrate surface; and applying the coating to the substrate surface by depositing a thermosetting powder on the substrate surface and applying heat to the powder to fuse it into the coating adhering to the substrate surface.

* * * * *